(12) United States Patent
Audeon et al.

(10) Patent No.: US 8,038,393 B2
(45) Date of Patent: Oct. 18, 2011

(54) MEMBER FOR LOCKING RING SECTORS ONTO A TURBOMACHINE CASING, COMPRISING MEANS ALLOWING IT TO BE GRASPED

(75) Inventors: David Audeon, Massy (FR); Kamel Benderradji, Livry sur Seine (FR)

(73) Assignee: SNECMA, Paris (FR)

( * ) Notice: Subject to any disclaimer, the term of this patent is extended or adjusted under 35 U.S.C. 154(b) by 631 days.

(21) Appl. No.: 12/205,230

(22) Filed: Sep. 5, 2008

(65) Prior Publication Data
US 2009/0081037 A1 Mar. 26, 2009

(30) Foreign Application Priority Data
Sep. 24, 2007 (FR) ..................................... 07 57801

(51) Int. Cl.
*F01D 25/24* (2006.01)
(52) U.S. Cl. .................................................. 415/214.1
(58) Field of Classification Search ................ 415/214.1
See application file for complete search history.

(56) References Cited

U.S. PATENT DOCUMENTS

| 5,197,853 | A | 3/1993 | Creevy et al. |
| 6,726,446 | B2 * | 4/2004 | Arilla et al. .................... 415/138 |
| 7,360,989 | B2 * | 4/2008 | Amiot et al. .................. 415/138 |
| 7,866,943 | B2 * | 1/2011 | Durand et al. ............. 415/173.1 |
| 2008/0267768 | A1 * | 10/2008 | Dakowski et al. ............ 415/115 |
| 2010/0058765 | A1 * | 3/2010 | Duval et al. ..................... 60/740 |
| 2011/0076135 | A1 * | 3/2011 | Gendraud et al. ............ 415/119 |

FOREIGN PATENT DOCUMENTS

| EP | 0 967 364 A1 | 12/1999 |
| EP | 1 099 826 A1 | 5/2001 |
| FR | 2 887 920 A1 | 1/2007 |

* cited by examiner

*Primary Examiner* — George Fourson, III
(74) *Attorney, Agent, or Firm* — Oblon, Spivak, McClelland, Maier & Neustadt, L.L.P.

(57) ABSTRACT

The present invention relates to a locking member (24) for a device for attaching ring sectors to an aircraft turbomachine casing, said member comprising two longitudinal clamping branches (28, 30) extending rearward and connected at their rear ends by a transverse connecting branch (32), their front ends being intended, between them, to press at least one ring sector (16) against at least one casing element (14). According to the invention, the member (24) further comprises means (42) allowing it to be grasped, these means being arranged such that they project rearward from the transverse branch (32).

10 Claims, 3 Drawing Sheets

MEMBER FOR LOCKING RING SECTORS ONTO A TURBOMACHINE CASING, COMPRISING MEANS ALLOWING IT TO BE GRASPED

TECHNICAL FIELD

The present invention relates in general to a locking member for a device for attaching ring sectors to an aircraft turbomachine casing, for example a turbine casing.

The invention also relates to an aircraft turbomachine comprising such locking members, it being possible for this turbomachine to adopt the form of a turboprop or a turbojet engine.

PRIOR ART

Ring sectors fixed circumferentially to the casing around the moving blades of the turbine of a turbojet engine are known from the prior art, these sectors together forming a continuous cylindrical envelope externally bounding the passage through which the stream of gases flows through the turbine. The ring sectors are mounted on an internal casing of the turbine by means of casing elements, known as intermediate casing elements or spacer pieces, to which they are attached at their front end and held at their rear end by locking members in the shape of a C or of a lying-down U. These locking members are fitted axially/longitudinally from the rear onto circumferential rims of the rear ends of the ring sectors and of the intermediate casing elements, in order to keep these pressed firmly together in the radial direction.

This attachment of the ring sectors onto the intermediate elements of the casing of the turbine allows them to accompany the thermal expansions and contractions of the turbine casing into which hot gases or cold gases are injected in order to control the thermal expansions and contractions thereof in order to maintain the smallest possible radial clearance between the internal surfaces of the ring sectors and the ends of the moving blades of the turbine and thus improve turbine efficiency.

In a known way, the locking members jointly form an annular locking device centered on the axis of the turbomachine, each member therefore forming just one angular sector of this device. Each member comprises two longitudinal clamping branches extending axially/longitudinally rearward and connected at their rear ends by a transverse connecting branch, while their front ends are intended to press between them at least one ring sector firmly against at least one casing element. These two items pressed firmly radially together are effectively designed to be housed in the space formed between the two longitudinal branches, which is open longitudinally toward the front.

The locking members are designed, particularly in terms of the elasticity and separation of the two longitudinal branches, so that the radial clamping force applied is strong. Now, when such is the case, extraction of these locking members, which is required for example during turbine maintenance operations, proves extremely difficult to achieve because of the substantial radial clamping force applied by the longitudinal branches to the circumferential rims. As a result, extraction usually requires the operator to employ a tool, the tool generally being of an unsuitable shape liable to damage the locking members and the surrounding parts. A situation such as this arises, for example, when use is made of a screwdriver that the operator attempts to slip in between one of the longitudinal branches of the member and the circumferential rim, in contact with this branch. What happens is that the screwdriver is then used like a crowbar liable to damage both the longitudinal branch and the circumferential rim concerned, or even to injure the operator.

OBJECT OF THE INVENTION

It is therefore an object of the invention to remedy, at least in part, the abovementioned disadvantages of embodiments of the prior art.

To do this, a first object of the invention is a locking member for a device for attaching ring sectors to an aircraft turbomachine casing, said member comprising two longitudinal clamping branches extending rearward and connected at their rear ends by a transverse connecting branch, their front ends being intended, between them, to press at least one ring sector against at least one casing element. According to the invention, it further comprises means allowing it to be grasped, these means being arranged such that they project rearward from said transverse connecting branch.

Thus, the invention in a novel way provides means allowing it to be grasped, these means being intended to make it easier to extract once it has been fitted onto the ring sectors. The special positioning of these means, which are offset rearward with respect to the longitudinal and transverse branches of the member, means that they can easily engage with an extraction tool without running the risk of impairing the functionalities of this locking member, particularly since there is therefore no direct contact between the tool and the aforementioned three branches. In other words, when the means for grasping are separated from the longitudinal inter-branch space in the longitudinal/axial direction by the transverse connecting branch, the fact that these means are seized with a tool means that no direct mechanical stress is applied to the longitudinal clamping branches, which therefore run no risk of being damaged by the pressure of the tool.

As a preference, said means allowing the member to be grasped comprise an extension projecting longitudinally rearward from said transverse connecting branch, and at least one recess made in said extension, this recess forming an abutment surface directed toward said transverse connecting branch. This abutment surface may therefore act as a bearing surface against which an extraction tool can bear, which tool can then be stressed backward in the longitudinal direction in order to bring about the desired extraction. Naturally, the abutment surface directed toward the transverse connecting branch may be substantially parallel to this branch, namely may run in the radial direction, but as an alternative may be inclined with respect to this same direction, the objective still, however, being to form, with this surface, an abutment in the rearward longitudinal direction, for a tool urged in the latter direction once it has been introduced into the associated recess.

As a preference, the locking member forms an angular sector of an annular locking device.

However, as a preference, said projecting extension extends over all or part of said angular sector in the circumferential direction and likewise each recess extends over all or part of said projecting extension in the circumferential direction.

By way of example, provision is made for the member to comprise two grooves each forming a recess in said projecting extension, said grooves opening in opposite directions of the radial direction in which said two longitudinal clamping branches, which can be likened to clamping jaws, are spaced apart.

Another object of the invention is a device for attaching ring sectors to an aircraft turbomachine casing, comprising casing elements formed with first rear circumferential rims to which second rear circumferential rims of the ring sectors are applied, the attachment device further comprising a plurality of locking members as described hereinabove, fitted onto said first and second circumferential rims in order to keep them pressed firmly against one another. In such an instance, the first and second circumferential rims, extending rearward in the longitudinal direction, therefore poke through the front opening of the members defined between the longitudinal clamping branches so that they can be kept pressed firmly radially together therein.

Another object of the invention is an aircraft turbomachine turbine comprising a device for attaching ring sectors as described hereinabove, and/or at least one locking member as described hereinabove. It may as an alternative be a turbomachine compressor, without departing from the scope of the invention.

A final object of the invention is an aircraft turbomachine comprising a turbine as described hereinabove and/or a device for attaching ring sectors as described hereinabove and/or at least one locking member as described hereinabove, it being equally possible for this turbomachine to be a turbojet or a turboprop engine.

Further advantages and features of the invention will become apparent from the nonlimiting detailed description which follows.

BRIEF DESCRIPTION OF THE DRAWINGS

This description will be given with reference to the attached drawings among which.

DETAILED DESCRIPTION OF THE PREFERRED EMBODIMENTS

Figure 1:
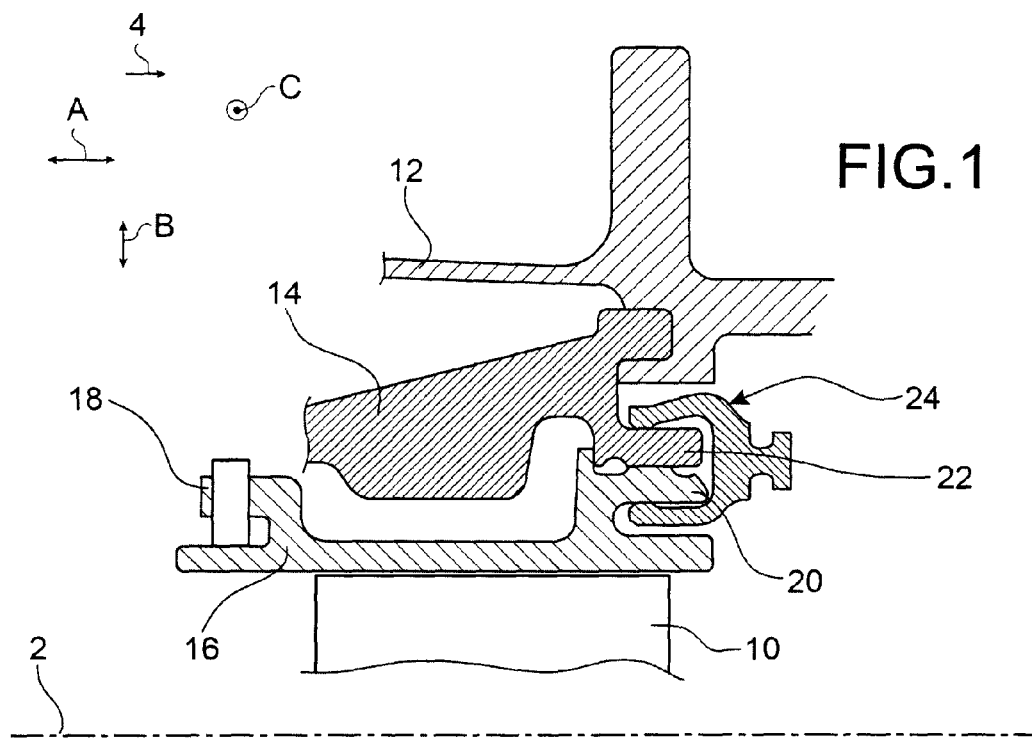
FIG. 1 depicts a part view in longitudinal section of a device for attaching ring sectors to an aircraft turbomachine turbine casing according to one preferred embodiment of the present invention.
Figure 2:
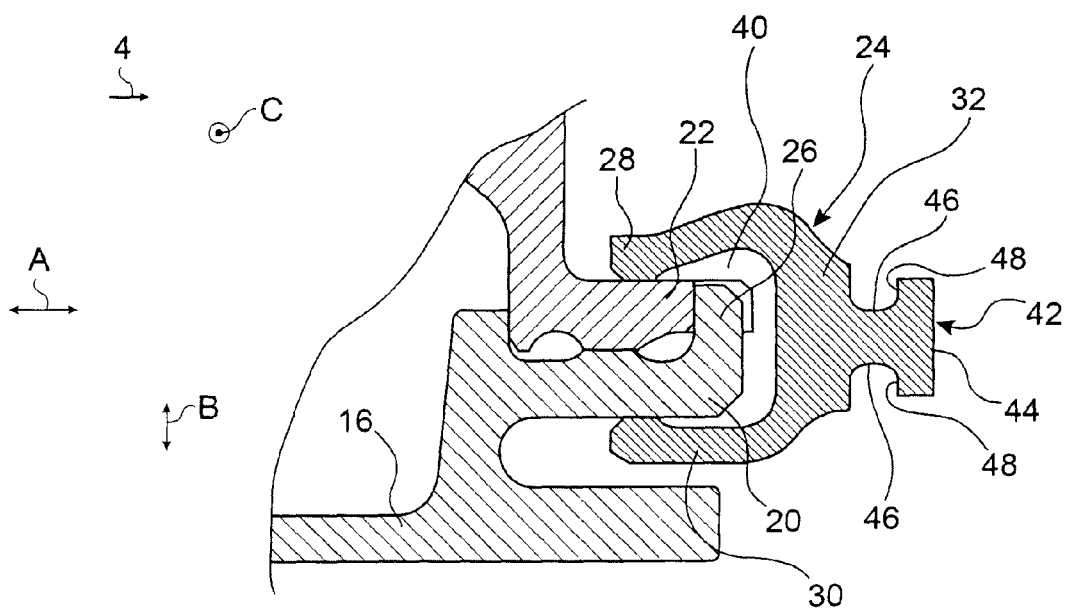
FIG. 2 depicts a partial and enlarged view of the view shown in FIG. 1.

FIGS. 1 and 2 together show a device for attaching ring sectors to an aircraft turbomachine turbine casing according to a preferred embodiment of the present invention.

In the figures, the direction A corresponds to the longitudinal or axial direction, parallel to the longitudinal axis 2 of the turbine and of the turbo-machine. The direction B for its part corresponds to the radial direction of the turbine, and the direction C to the circumferential direction. In addition, the arrow 4 schematically depicts the main direction in which the gases flow through the turbomachine, parallel to the direction A, the terms "front", "upstream", "rear", "downstream" used in the remainder of the description being understood to be with reference to the direction or this arrow 4.

In FIG. 1, the reference 10 denotes the moving blades of a high-pressure turbine stage of a turbojet engine, which rotate in a turbine casing 12 inside which casing elements 14, known as spacer pieces or intermediate casing elements, are attached. The elements 14 bear ring sectors 16 positioned circumferentially about the axis of rotation 2 of the turbine in the direction C, the internal surfaces of these ring sectors forming a continuous cylindrical surface which externally delimits a passage through which the stream of gas passes through the turbine.

The ring sectors 16 have an annular extent of about 10 to 20° about the axis of the turbine and are, for example, around thirty in number.

Each ring sector 16 at its upstream or front end comprises a circumferential rim 18 in the form of a portion of a cylinder, via which it is attached or attached to a spacer piece 14, and also at its rear or downstream end comprises a circumferential rim 20 in the form of a portion of a cylinder which is pressed firmly against a corresponding circumferential rim 22 in the form of a portion of a cylinder belonging to the spacer piece 14. In that which follows, the circumferential rim 22 is termed the first circumferential rim, and the circumferential rim 20 is termed the second circumferential rim.

The two circumferential rims 20 and 22 that run in the direction A are pressed firmly together in the direction B in which they are superposed by a locking member 24 in the shape of a C or of a lying-down U which is fitted from the rear over the circumferential rims 20 and 22 and which keeps them radially clamped together.

At the same time, the locking members 24 form an annular locking device centered on the axis 2 and forming an integral part of the device for attaching the ring sectors. Thus, each member 24 adopts the form of an angular sector of the annular locking device, extending for example over around 10 to 20°. In order to form a complete, preferably continuous, ring, these are designed to be adjacent in the direction C, there being, for example, around thirty of these, centered on the axis 2.

In this regard, it must be noted that while the angular extent of the members 24 about the axis 2 of the turbine may be of the same order as the extent of the ring sector 16, this extent may, as an alternative, be greater, without departing from the scope of the invention. Thus, as the case may be, it is possible to provide one locking member 24 per ring sector 16, or alternatively, one locking member 24 for several ring sectors 16.

The ring sectors 16, the spacer pieces 14 and the locking members 24 are made of metal, and the locking members 24 are tightly elastically fitted onto the circumferential rims 20 and 22 to press them firmly together with a certain preload in the radial direction B, as will be detailed hereinafter.

As depicted schematically in FIG. 2, the second circumferential rim 20 belonging to the ring sector 16 ends at its rear end in outwardly directed radial teeth 26 engaged in corresponding notches belonging to the first circumferential rim 22 of the spacer piece 14, so as to immobilize each ring sector 16 on a spacer piece 14 in terms of rotation about the axis 2 of the turbine.

In general, each locking member 24 comprises two longitudinal clamping branches 28 and 30, these respectively being a radially external and a radially internal branch, which are rigidly joined together at their rear end by a transverse connecting branch 32, and the front ends of which are pressed against the external cylindrical face of the first circumferential rim 22 of the spacer piece 14 and onto the internal cylindrical face of the second circumferential rim 20 of the ring sector 16 respectively. Overall, the circumferential branches 28, 30 extend longitudinally in the direction A, while the circumferential branch 32 extends in the radial direction B to join the two rear ends of the branches 28, 30 together. The latter two branches, which are spaced apart in the direction B, together form, therefore, an inter-branch space 40 that is open toward the front in the direction A for the passage of the rims 20, 22 and closed toward the rear in this same direction A by the connecting branch 32.

More specifically, with reference to FIG. 2, one of the special features of the present invention lies in the siting of means allowing the locking member 24 to be grasped, these means in general terms being arranged such that they project rearward from the transverse connecting branch 32.

These means, which bear the numerical reference 42, preferably adopt the form of an extension 44 projecting longitudinally rearward from the transverse connecting branch 32, in which at least one recess 46, and preferably two opposing recesses 46 is (are) produced. As a preference, the branches 28, 30, 32 and the extension 44 are made as a single piece, and the recesses 46 are preferably obtained by machining.

In this configuration, each recess 46 adopts the form of a socket or of a groove running in the direction C, open radially toward the outside and toward the inside, respectively. The purpose of such a groove 46 is to offer, in the form of its rearmost side wall, an abutment surface 48 directed toward the transverse connecting branch 32. This abutment surface 48, which in this instance is preferably orthogonal to the axis 2 and parallel to the radial direction B, can therefore act as a bearing surface for a tool used to extract the member 24, which can then be urged in the rearward longitudinal direction in order to bring about the desired extraction. What happens is that the means 42 allowing the member 24 to be grasped are intended to make it easier to extract once it has been fitted onto the ring sectors 16. The special positioning of these means, which are offset rearward with respect to the transverse branch 32, means that they can easily engage with an extraction tool without running the risk of impairing the functionalities of this locking member 24, particularly since there is therefore no direct contact between the tool and the branches 28, 30, 32. As will be detailed hereinafter, the fact that these means 42 are seized with a tool entering the recesses 46 and bearing against the abutment surfaces 48 means that no direct mechanical stress is applied to the longitudinal clamping branches 28, 30, which therefore run no risk of being damaged by the pressure of the tool.

Figure 3:
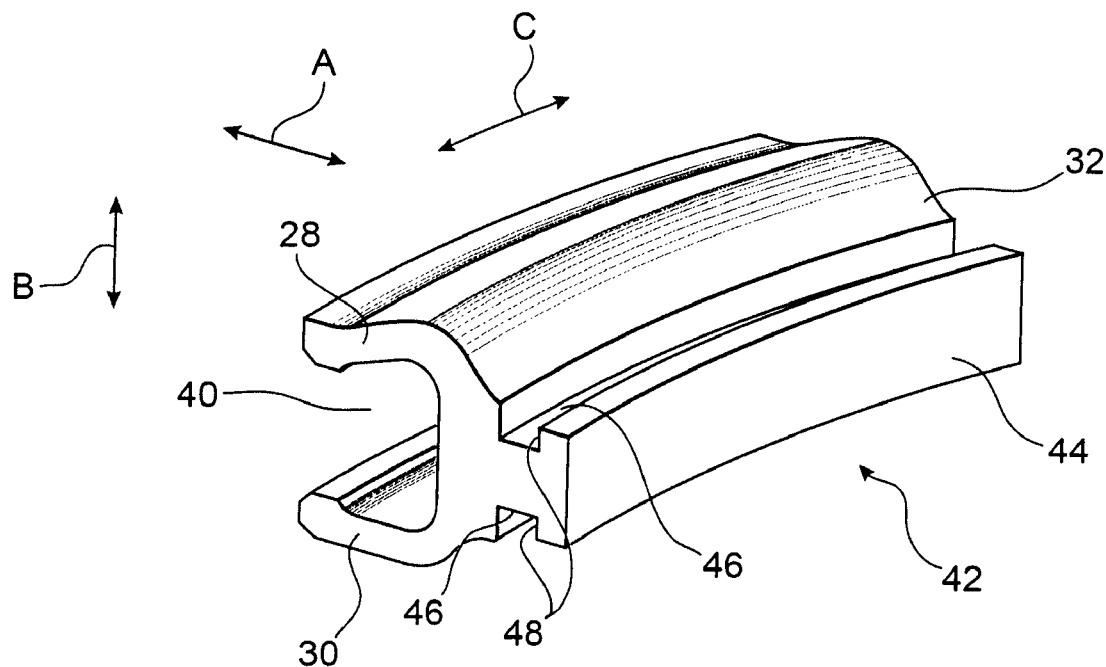
FIG. 3 depicts a perspective view of a locking member belonging to the device for attaching ring sectors shown in FIGS. 1 and 2.
Figure 4:
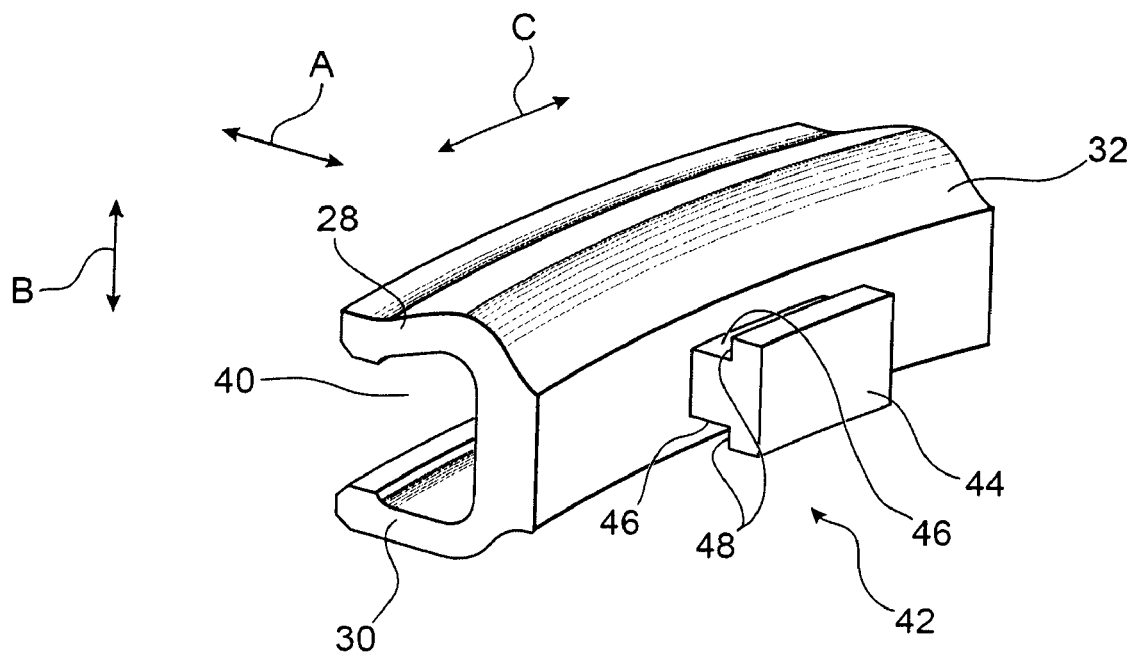
FIG. 4 depicts a view similar to the one shown in FIG. 3, the locking member being in the form of an alternative embodiment.

FIG. 3 shows that the projecting extension 44 extends over the entire angular sector in the circumferential direction C which means that the branches 28, 30, 32 and the extension 44 each have the same angular length in this same direction C. Naturally, the situation could be otherwise, as depicted in FIG. 4 in which the extension 44 has a shorter angular length in the direction C than the branches 28, 30, 32. This configuration is advantageous insofar as it makes it possible to reduce the overall mass of each locking member 24.

Likewise, irrespective of which of the two above scenarios is being considered, each radially open groove 46 extends over the entire extension 44 in this same direction C, or alternatively, extends over just a portion thereof, without departing from the scope of the invention.

Finally, it must be mentioned that although the two grooves 46 shown in FIG. 2, are aligned in the radial direction B, that is to say are situated at the same level in the longitudinal direction A, they could be offset from one another in the latter direction without departing from the scope of the invention.

Figure 5A:
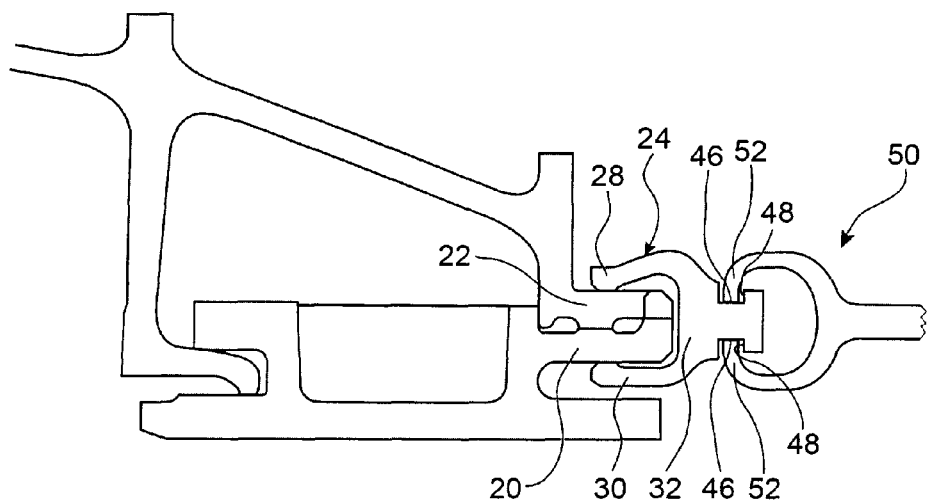
FIGS. 5a and 5b schematically depict a method of extracting the locking member shown in FIGS. 1 to 3.
Figure 5B:
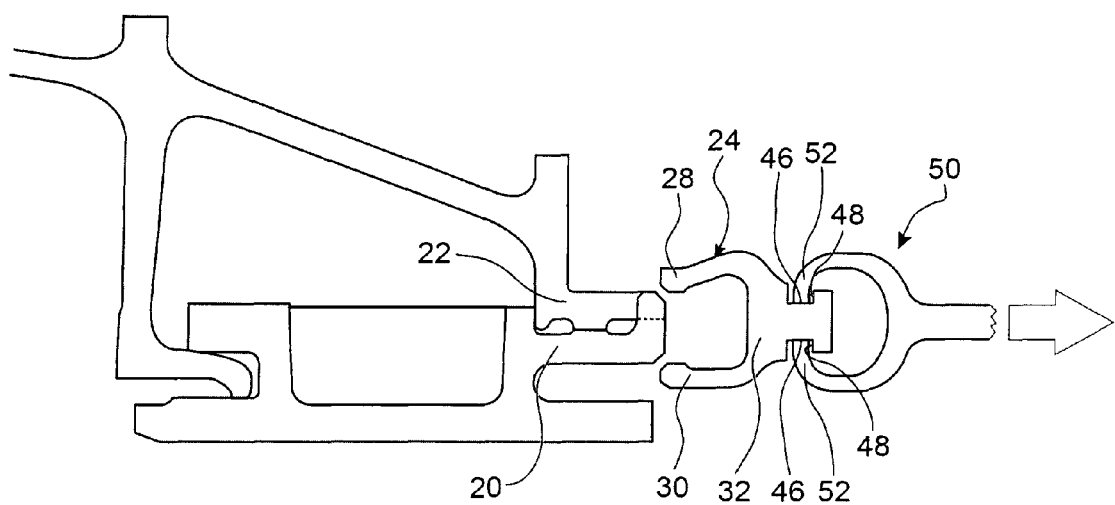

Reference is now made to FIGS. 5a and 5b which schematically depict a method aimed at extracting a locking member 24 initially situated in its position for clamping the ring sectors 16, which position is shown in the previous figures. To do this, a tool 50 of appropriate shape is used, this tool overall having a yoke-shaped head comprising two arms respectively provided with two ends 52 facing one another and capable of being positioned in the direction B. The two ends 52 that face one another are inserted into each of the two grooves 46 respectively, for example by moving the tool circumferentially with respect to the member 24, in order to achieve the desired penetration. Next, the tool 50 is urged rearward in the longitudinal direction A, either by hand or automatically, this having the effect of bringing the ends 52 into contact with their respective abutment surfaces 48, as shown in FIG. 5a. Continuing this action on the tool 50 as depicted schematically by the arrow 54 in FIG. 5b causes the member 24 to be moved gradually in the direction A as the branches 28, 30 slide rearward along the rims 20, 22 until the member 24 is completely extracted, thus freeing the associated ring sectors 16.

Of course, various modifications may be made by those skilled in the art to the invention that has just been described solely by way of nonlimiting example.

The invention claimed is:

1. A locking member for a device for attaching ring sectors to an aircraft turbomachine casing, said member comprising two longitudinal clamping branches extending rearward and connected at their rear ends by a transverse connecting branch, their front ends being intended, between them, to press at least one ring sector against at least one casing element, which member further comprises means allowing it to be grasped, these means being arranged such that they project rearward from said transverse connecting branch.

2. The locking member as claimed in claim 1, wherein said means allowing the member to be grasped comprise an extension projecting longitudinally rearward from said transverse connecting branch, and at least one recess made in said extension, this recess forming an abutment surface directed toward said transverse connecting branch.

3. The locking member as claimed in claim 2, and which forms an angular sector of an annular locking device.

4. The locking member as claimed in claim 3, wherein said projecting extension extends, in a circumferential direction, over all or part of said angular sector.

5. The locking member as claimed in claim 3 or claim 4, wherein each recess extends, in the circumferential direction, over all or part of said projecting extension.

6. The locking member as claimed in claim 5, and which comprises two grooves each forming a recess in said projecting extension, said grooves opening in opposite directions of a radial direction in which said two longitudinal clamping branches are spaced apart.

7. A device for attaching ring sectors to an aircraft turbomachine casing, comprising casing elements formed with first rear circumferential rims to which second rear circumferential rims of the ring sectors are applied, wherein the attachment device further comprises a plurality of locking members as claimed in any one of the preceding claims, fitted onto said first and second circumferential rims in order to keep them pressed firmly against one another.

8. A turbine for an aircraft turbomachine comprising a device for attaching ring sectors as claimed in claim 7, or at least one locking member as claimed in any one of claims 1 to 6.

9. An aircraft turbomachine comprising a turbine as claimed in claim 8 or a device for attaching ring sectors as claimed in claim 7 or at least one locking member as claimed in any one of claims 1 to 6.

10. The turbomachine as claimed in claim 9, and which is a turbojet or a turboprop engine.

* * * * *